(12) United States Patent  
Bachmann et al.

(10) Patent No.: US 7,689,646 B2  
(45) Date of Patent: Mar. 30, 2010

(54) SYSTEM AND METHOD FOR ASSESSING WEB SERVICE COMPATIBILITY

(75) Inventors: Hans Ruediger Bachmann, Karlsruhe (DE); Vladislav Bezrukov, Sandhausen (DE); Timm Falter, Sinsheim (DE); Claus von Riegen, Wisloch (DE); Alexander Zubev, Pazadjik (BG)

(73) Assignee: SAP (AG), Walldorf (DE)

( * ) Notice: Subject to any disclaimer, the term of this patent is extended or adjusted under 35 U.S.C. 154(b) by 616 days.

(21) Appl. No.: 11/541,352

(22) Filed: Sep. 28, 2006

(65) Prior Publication Data

US 2008/0082660 A1    Apr. 3, 2008

(51) Int. Cl.
  G06F 15/16    (2006.01)
  G06F 9/44     (2006.01)
(52) U.S. Cl. .................. 709/203; 709/217; 717/168
(58) Field of Classification Search .............. None
  See application file for complete search history.

(56) References Cited

U.S. PATENT DOCUMENTS

| | | | |
|---|---|---|---|
| 6,721,729 B2* | 4/2004 | Nguyen et al. ............. 707/3 |
| 6,839,724 B2* | 1/2005 | Manchanda et al. ......... 707/203 |
| 7,406,520 B2* | 7/2008 | Schneider et al. .......... 709/225 |
| 2002/0174117 A1 | 11/2002 | Nykanen |
| 2003/0208572 A1 | 11/2003 | Shah et al. |
| 2004/0107196 A1 | 6/2004 | Chen et al. |
| 2004/0168153 A1* | 8/2004 | Marvin ..................... 717/120 |
| 2005/0038771 A1 | 2/2005 | Sugihara et al. |
| 2005/0044197 A1* | 2/2005 | Lai ......................... 709/223 |
| 2005/0131912 A1 | 6/2005 | Lin et al. |

OTHER PUBLICATIONS

Non-Final Office Action for U.S. Appl. No. 11/643,413 Mailed Nov. 24, 2008, 15 pages.

* cited by examiner

*Primary Examiner*—John B. Walsh
(74) *Attorney, Agent, or Firm*—Blakely, Sokoloff, Taylor & Zafman LLP

(57) ABSTRACT

Differences between two web services are identified and quantified by a set of parameters. Each parameter is drawn from a discrete set of values that describes an aspect of the difference. The set of parameters is provided to a client of the web service.

16 Claims, 4 Drawing Sheets

```
<RequestType="ComputeTax">
  <Provider="Acme Tax Consultants"/>
  <parameters>
    <parameter
       name="product-type"
       dataType="string"/>                    ─220

<parameter
       name="extended-price"
       dataType="fixed-point"/>               ─230

<parameter
       name="purchaser-location"
       dataType="geolocator"/>                ─240

<parameter
       name="seller-location"
       dataType="geolocator"/>                ─250

<parameter
       name="delivery-location"
       dataType="geolocator"/>                ─260
  </parameters>
</RequestType>
```

*Fig. 2A*

210 brackets the five parameters.

```
<RequestType="ComputeTax">
  <Provider="Acme Tax Consultants"/>
  <parameters>
    <parameter
       name="product-type"
       dataType="string"/>

<parameter
       name="extended-price"
       dataType="fixed-point"/>

<parameter
       name="currency"
       optional
       default-value="$"                      ─270
       dataType="symbol"/>

<parameter
       name="purchaser-location"
       dataType="geolocator"/>

<parameter
       name="seller-location"
       dataType="geolocator"/>

<parameter
       name="delivery-location"
       dataType="geolocator"/>
    <parameter
       name="authorization"                   ─280
       dataType="credential"/>
  </parameters>
</RequestType>
```

*Fig. 2B*

```
<ResponseType="ComputeTax">
   <Provider="Acme Tax Consultants"/>
   <parameters>
      <parameter
         name="jurisdiction"
         dataType="string"/>                    320
      <parameter
         name="tax-amount"
         dataType="fixed-point"/>               330
   </parameters>
</RequestType>
```

*Fig. 3A*

310 brackets the parameters block.

```
<ResponseType="ComputeTax">
   <Provider="Acme Tax Consultants"/>
   <parameters>
      <parameter
         name="jurisdiction"
         dataType="string"/>

<parameter
         name="tax-amount"
         dataType="fixed-point"/>
      <parameter                                340
         name="specials-explanation"
         optional
         dataType="string"/>
   </parameters>
</RequestType>
```

*Fig. 3B*

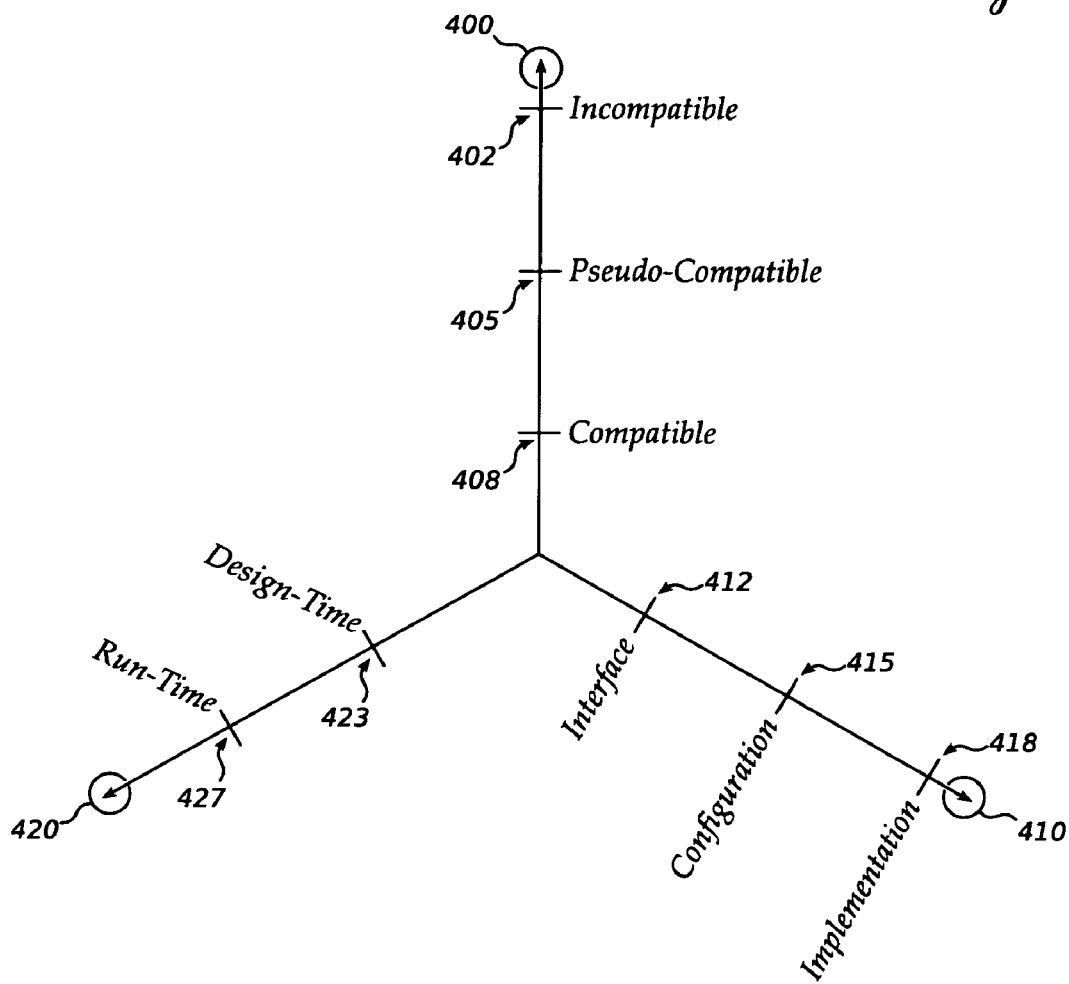

SYSTEM AND METHOD FOR ASSESSING WEB SERVICE COMPATIBILITY

FIELD

The invention relates to service versioning. More specifically, the invention relates to procedures to identify changes and determine necessary responsive actions.

BACKGROUND

Contemporary data processing activities are frequently distributed among a number of independent computer systems that use a communication fabric such as a local- or wide-area network to coordinate their operations. This model of data processing is generally more complex and somewhat less efficient than older arrangements where a complete, clearly-defined processing operation occurs at a single system and a "finished" data product may be transmitted to another location. In a distributed system, it is not uncommon for portions of closely-linked processing sequences to occur on different systems, with both partially-processed data and executable code passing between the systems over a communication link.

Various advantages are available from distributed processing. For example, computationally expensive or time-consuming operations can be consolidated and performed by a system designed specifically to perform those operations quickly; competing providers of standardized processing can establish a market to provide the services at a range of price/performance points; and decoupling phases of a processing sequence can make it easier to design robust systems that can continue operation despite failures of individual machines or communication links.

One difficulty that arises in designing and operating distributed data processing systems is in specifying the interfaces through which cooperating processing elements will communicate. Standards such as the Common Object Request Broker Architecture ("CORBA") by the Object Management Group ("OMG") consortium and the Web Services Description Language ("WSDL") by the international World Wide Web Consortium ("W3C") provide a great deal guidance in this area, but even assuming that all interoperational difficulties that are common to distributed systems could be addressed by the standards, individual distributed service clients and providers must agree even more closely on the methods and meanings of their interactions.

Computer programs and services have traditionally been identified by a numeric version number. In one common usage, a two-part number describes the "major" and "minor" versions (e.g. version 2.6). A change in minor version number usually indicates that, while something has changed, the program or system can be expected to continue to work as it did in the past. A new major version number sometimes means that incompatibilities may be encountered. This coarse-grained versioning system is adequate for many purposes, but can become unwieldy when information about a large number of intricate and change-sensitive interfaces must be conveyed. A more precise method to describe changes in this environment may be of use.

SUMMARY

Embodiments of the invention permit a service provider to offer, and a service consumer to receive, detailed information about changes to an underlying service. Information about several different characteristics may be provided. Each characteristic may be rated or graded on a scale containing a small number of discrete steps to simplify automatic processing of the information.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

FIGS. 2A and 2B show a first and second request structure.

FIGS. 3A and 3B show a first and second response structure.

FIG. 4 represents the state space from which change tokens are drawn.

FIG. 5 shows an alternate way of representing a change token.

DETAILED DESCRIPTION

Figure 1:
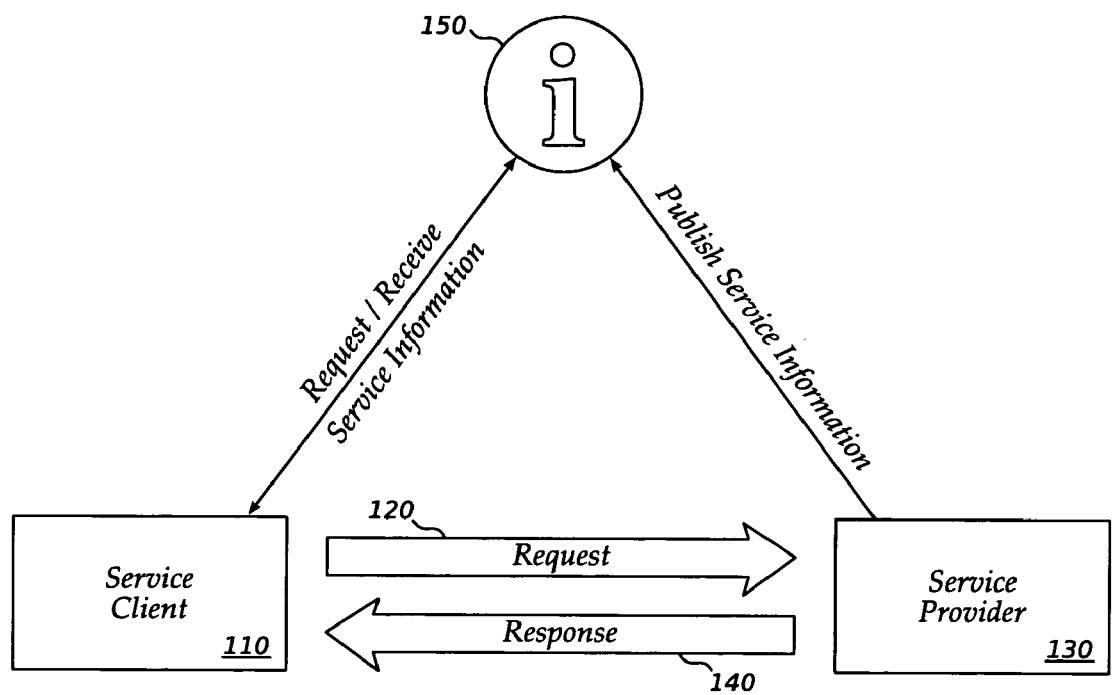
FIG. 1 shows a logical overview of an environment where embodiments of the invention may be used.

Distributed computer systems and applications built thereon have a high level of inherent complexity. Understanding even the simplest example distributed service requires a broad knowledge of computer, data encoding, communication, and other technologies, and a simple example may fail to convey the motivations and concerns that affect the design of a practical system. Operations according to an embodiment of the invention will be described with reference to a small and well-defined, but not trivial, example web service: tax computation.

Although computing taxes on a purchase of physical goods to be delivered at the point of sale can be as simple as multiplying the extended price by a fixed percentage, the general problem of computing taxes can be vastly more complicated. Factors such as the type of goods or services, the identity of the purchaser, and the place of delivery or performance combine with a morass of local, regional, national and sometimes international laws to create a significant challenge. Furthermore, tracking changes in the interactions between these and other factors may be a full-time occupation. No wonder, then, that tax computation is a realistic data processing service that a provider could offer as a component of a distributed application.

FIG. 1 shows a logical overview of an environment where a web service can operate. The essential features of a distributed computation system are a service client 110, which transmits a request 120 to a service provider 130 and receives a response 140 in return. In some systems, an information broker 150 may be used to make it easier for service client 110 to find a provider that offers the desired service and to discover the protocol that the provider requires. The Universal Description, Discovery and Integration ("UDDI") specification prepared by the international Organization for the Advancement of Structured Information Standards ("OASIS") consortium describes one possible information broker architecture.

FIG. 2A shows the structure of a request message that a service client might send to a service provider that calculates taxes. The representation bears some similarities to the Extensible Markup Language ("XML"), which is sometimes used as an Interface Definition Language ("IDL"), but it is not intended to represent a complete and correct interface definition for any particular programming environment. The request message contains a number of informational elements 210 that a tax-calculating service may require to perform the desired calculation. For example, the request contains an identification of the product or service 220, the extended price 230, the purchaser's location 240, the seller's location 250, and a delivery location 260. An actual, comprehensive tax calculation system might require other or different information.

Contrast the request structure of FIG. 2A with that shown in FIG. 2B. In the latter Figure, several changes are indicated. First, the extended price element has been augmented with an optional currency indicator 270. Second, an authorization parameter 280 has been added. Similarly, comparing the response structure shown in FIG. 3A (containing output parameters 310 for jurisdiction 320 and tax-amount 340) with the analogous post-change structure in FIG. 3B, one notes the addition of an optional string parameter 340 to describe any special conditions encountered during tax computation. The following discussion will consider each of these changes independently; if all of the changes were made at once, then the most wide-ranging client adaptations would be required.

Embodiments of the invention construct an information-rich change token to describe differences between two distributed data processing services. Typically, the services will be earlier and later versions of the same general functionality, where one service can reasonably be substituted for the other at the same point in a sequence of distributed operations. (It would make little sense, for example, to substitute a temperature forecast from a weather service for a tax calculation, but a detailed tax calculation might replace a simple one.) The change token may be coupled with a traditional version number or other similar indicator, but the token provides detailed information to answer questions a user or administrator of a service client might have about a changed service, whereas the traditional version indicator may do no more than alert the client that something has changed.

A change token according to an embodiment of the invention includes a plurality of values, where each value identifies, conceptually, a point along an axis describing an aspect of the change. This is shown in FIG. 4. For example, one axis of keen interest to service consumers might be described as "compatibility" 400. Given a change (announced, for example, by a different version number) a service consumer's first question may be, "must the service client be changed?" Values along the "compatibility" axis may include "compatible" 408 to indicate that no changes occurred that could cause a client of the previous service to fail when communicating with the current service; "pseudo-compatible" 405 to indicate that measures have been taken at the service provider to detect clients adapted for the previous service and to avoid interpreting input parameters differently or sending unexpected result parameters that could cause failure; or "incompatible" 402, to indicate that a client adapted for the previous service version will be unable to interact successfully with the new service. In relation to the two request structures shown in FIGS. 2A and 2B and the two response structures shown in FIGS. 3A and 3B, the optional currency indicator 270 may represent a compatible change, while the mandatory authorization parameter 280 is an incompatible change. The optional output parameter 340 added to the response format in FIG. 3B may be described as "pseudo-compatible."

Compatible changes may be associated with the following characteristics: a web service provider can continue to receive service requests from pre-change clients (without failure), and can continue to send service responses to those clients (also without failure). In other words, an unchanged client application can continue to interact successfully with the altered service. Adding new services and new data types, adding new optional parameters, expanding acceptable ranges of values, changing mandatory parameters to optional, and removing security/authentication requirements are possible examples of compatible changes.

Pseudo-compatible changes are those where an unchanged client can continue to interact successfully with the altered service, but the web service provider's Information Technology ("IT") infrastructure must perform some additional internal input/output ("I/O") transformations. Adding a new, optional response field (as shown in FIG. 3B) is an example of a pseudo-compatible change. The web service may detect the earlier client and remove the newly-added optional response field before sending a reply to the client. In some embodiments, the structure or operation of the distributed environment or information broker service may influence the way pseudo-compatible changes are implemented. For example, in the UDDI environment, a new entity (with a corresponding Web Services Description Language ("WSDL") specification) is added. The new entity has a predecessor-successor relationship with another version of the service. The old service definition is frozen and only the latest service definition can be changed. If a web service consumer calls the old service endpoint, an internal conversion of the response data may be done according to the old response structure, so the newly-added response field will be discarded before the response is returned to the client. This approach can help maintain compatibility when clients do not ignore unexpected, optional response data.

Incompatible changes are those that prevent the service provider and (unaltered) service client from successfully completing a service request. A service client must be altered to be able to continue to use a service that has been changed in an incompatible way. Examples of incompatible changes include adding a security or authentication requirement where there was none, adding mandatory parameters to complex types, changing optional parameters to mandatory, changing the type of an element, and deleting or renaming an operation.

A second axis 410 of the change token may indicate whether the difference between the two data processing services is a change to an interface 412, to a configuration 415 or to an implementation 418. The types of changes which are described by those values are not necessarily mutually disjoint, but with well-defined mappings, all real-world changes will map to exactly one of the values (not to more than one). There is also some overlap of values along this axis with values on the compatibility axis, but they are not mere restatements of each other. Addition or removal of an element of a request or response is an interface change, while a change in the interpretation of an existing input parameter, or the meaning of an output parameter, is an implementation change. A configuration change may affect the infrastructure involved in receiving or providing the service, but not the service itself. For example, changes in non-functional aspects like service quality, security or auditability (session handling, authentication levels, authorizations, or transport guarantees) may require corresponding administrative changes at the service client. These changes may affect the syntactics and/or semantics of the service.

A third axis 420 of the change token may indicate when changes to the client are required. For example, adding or removing a request element may permit (if the element is optional) or require (if the element is mandatory) a change in the client's design (a "design-time" change) 423. On the other hand, if the change is to the value of a parameter (for example, the server demands an authorization from a different certifying authority) then this change token parameter may indicate a "run-time" change 427.

Values along other axes may be incorporated into the change token to answer questions that arise in particular client/server relationships. Note that values along each of the axes described above are discrete and small in number. This facilitates the automatic processing of change token values. In essence, a system can prepare an n-dimensional matrix of the n change token parameters and decide, for each matrix position, whether, what, and when changes to the service client must be made.

FIG. 5 shows another way of viewing a change token: as a tuple containing as many elements as there are change-description axes, with the tuple values selected from the discrete positions along each axis. The example change token of FIG. 5 indicates a pseudo-compatible 510, interface 520, design-time 530 change.

Change tokens provide detailed information about a directed difference between two data processing services. That is, a compatible change from a first service to a second service does not necessarily imply that a client adapted for the second service can successfully use the first service. For example, if the second service adds an optional parameter, a client that transmits the parameter in a transaction would fail to interact with a server that implements the first service (and does not expect the optional parameter).

Change tokens may be communicated from a server to a client as part of the request/response transaction. For example, in one embodiment, the client may transmit a version identifier of the service it expects, and the server may return a change token describing any difference between this expected service and the service available from the server. The version identifier may be a traditional version number, an identifying name, or other similar item. Multiple versions of a service may be related, by different change tokens, to the same "new" service. If the change token indicates an incompatible change, the client may terminate the interaction because there is no hope of completing a successful transaction. In some embodiments, the client's expected version of the protocol is implicit in the Uniform Resource Locator ("URL") the client uses to contact or request the service. Therefore, a client request need not always contain an explicit version identifier.

One embodiment of the invention can be used with an information broker such as a UDDI server, as shown in FIG. 1. In this arrangement, a service provider could publish the change token along with other information about the service in the broker. A client could query the broker for information about providers of a web service, and retrieve the token along with other information about each provider. Armed with this information, the client can automatically select from among the providers based on their compatibility with the client.

Another use of the change tokens described here is to inform development plans at a web service consumer. For example, the web services used by a system can be queried and, of a list of services that have had some change, clients for those services that have undergone an incompatible change may be upgraded first. Furthermore, among those client changes, run-time changes may be easier to address and may therefore require a smaller allocation of time and development resources. Thus, the change tokens can help with engineering development scheduling and estimation tasks.

An embodiment of the invention may be a machine-readable medium having stored thereon instructions which cause a processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), including but not limited to Compact Disc Read-Only Memory (CD-ROMs), Read-Only Memory (ROMs), Random Access Memory (RAM), and Erasable Programmable Read-Only Memory (EPROM).

The applications of the present invention have been described largely by reference to specific examples and in terms of particular allocations of functionality to certain hardware and/or software components. However, those of skill in the art will recognize that web service compatibility can also be assessed by software and hardware that distribute the functions of embodiments of this invention differently than herein described. Such variations and implementations are understood to be captured according to the following claims.

We claim:

1. A method comprising:

receiving a request from a client comprising a processor at a server comprising a processor for a first data processing service, the first data processing service not included on the server, wherein the client and the server are included in a distributed computer system;

identifying a difference between the first data processing service and a second data processing service included on the server, the second data processing service included in an application executed via the distributed computer system;

representing the difference between the first and second data processing service as a plurality of discrete values, each discrete value to indicate a characteristic of the difference, wherein the characteristic of the difference between the first and second data processing services comprises at least one of service compatibility, change type, and change time; and providing the plurality of discrete values to the client.

2. The method of claim 1, wherein representing the difference as a plurality of discrete values further comprises:

selecting one of the discrete values to indicate compatibility from a set including compatible, pseudo-compatible and incompatible;

selecting one of the discrete values to indicate change type from a set including interface, configuration and implementation; and selecting one of the discrete values to indicate change time from a set including design-time and run-time.

3. The method of claim 1, further comprising: associating a service version identifier with the plurality of discrete values, wherein the service version identifier indicates the second data processing service is based on the first data processing service.

4. The method of claim 1, further comprising:

receiving, from the client, an indication that the second data service is not compatible with the client;

identifying a difference between the first data processing service and a third data processing service included on the server, the third data processing service included in the application distributed among computer systems including the client and the server;

representing the difference between the first data processing service and the third data processing service as an additional plurality of discrete values, each discrete value to indicate a characteristic of the difference; and providing the additional plurality of discrete values to the client.

5. The method of claim 1, further comprising:

preparing a change token to describe the plurality of discrete values; and publishing the change token through an information broker.

6. The method of claim 5, wherein the change token is a tuple containing a plurality of elements, each element to be drawn from a plurality of discrete positions along a change-description axis wherein
- a first element is drawn from a first plurality of discrete positions along a compatibility axis, the first plurality including compatible, pseudo-compatible and incompatible;
- a second element is drawn from a second plurality of discrete positions along a change-type axis, the second plurality including interface, configuration and implementation, and
- a third element is drawn from a third plurality of discrete positions along a change time axis, the third plurality including design-time and run-time.

7. The method of claim 5, further comprising:
- querying the information broker for providers of a web service;
- retrieving a plurality of change tokens corresponding to a plurality of web services from the information broker; and
- automatically selecting one of the plurality of web services based on a value of a corresponding one of the change tokens.

8. A computer-readable storage medium containing instructions that, when executed by a system including a programmable processor, cause the system to perform operations comprising:
- receiving a request from a client at a server for a first data processing service, the first data processing service not included on the server, wherein the client and the server are included in a distributed computer system;
- identifying a difference between the first data processing service and a second data processing service included on the server, the second data processing service included in an application executed via the distributed computer system;
- representing the difference between the first and second data processing service as a plurality of discrete values, each discrete value to indicate a characteristic of the difference, wherein the characteristic of the difference between the first and second data processing services comprises at least one of service compatibility, change type, and change time; and
- providing the plurality of discrete values to the client.

9. The computer-readable storage medium of claim 8 containing additional instructions to cause the system to perform operations comprising:
- publishing the plurality of discrete values via an information broker, the plurality of discrete values included in a change token.

10. The computer-readable storage medium of claim 9, wherein the information broker is a Universal Description, Discovery and Integration ("UDDI") server.

11. The computer-readable storage medium of claim 8, wherein representing the difference as a plurality of discrete values further comprises:
- selecting one of the discrete values to indicate compatibility from a set including compatible, pseudo-compatible and incompatible;
- selecting one of the discrete value to indicate change type from a set including interface, configuration and implementation; and
- selecting one of the discrete values to indicate change time from a set including design-time and run-time.

12. A distributed computer system comprising:
a client comprising a processor; and
a server comprising a processor operatively coupled to the client, the server including a first data processing service included in an application executed via the distributed computer system, the server to
- receive a request from the client for a second data processing service, the second data processing service not included on the server;
- identify a difference between the first data processing service and the second data processing service;
- represent the difference between the first and second data processing service as a plurality of discrete values, each discrete value to indicate a characteristic of the difference, wherein the characteristic of the difference between the first and second data processing services comprises at least one of service compatibility, change type, and change time; and
- provide the plurality of discrete values to the client.

13. The system of claim 12, the server to further:
- select one of the discrete values to indicate compatibility from set including compatible, pseudo-compatible and incompatible,
- select one of the discrete value to indicate change type from a set including interface, configuration and implementation, and
- select one of the discrete values to indicate change time from a set including design-time and run-time.

14. The system of claim 12, the server to further associate a service version identifier with the plurality of discrete values, wherein the service version identifier indicates the first data processing service is based on the second data processing service.

15. The system of claim 12, the server to further
- receive, from the client, an indication that the second data service is not compatible with the client,
- identify a difference between the first data processing service and a third data processing service included on the server, the third data processing service included in the application distributed among computer systems including the client and the server,
- represent the difference between the first data processing service and the third data processing service as an additional plurality of discrete values, each discrete value to indicate a characteristic of the difference, and
- provide the additional plurality of discrete values to the client.

16. The system of claim 12, the server to further
- prepare a change token to describe the plurality of discrete values, and
- publish the change token through an information broker, wherein the change token is a tuple containing a plurality of elements, each element to be drawn from a plurality of discrete positions along a change-description axis, including
  - a first element drawn from a first plurality of discrete positions along a compatibility axis, the first plurality including compatible, pseudo-compatible and incompatible,
  - a second element drawn from a second plurality of discrete positions along a change-type axis, the second plurality including interface, configuration and implementation, and
  - a third element drawn from a third plurality of discrete positions along a change time axis, the third plurality including design-time and run-time.

* * * * *